United States Patent
Boughner et al.

(10) Patent No.: US 9,707,927 B1
(45) Date of Patent: Jul. 18, 2017

(54) SEATBELT BUCKLE APPARATUSES INCLUDING SWITCH WIRE HARNESSES AND STRAIN RELIEF THEREOF

(71) Applicant: Autoliv ASP, Inc., Ogden, UT (US)

(72) Inventors: Jonathon Boughner, Lake Orion, MI (US); Jon E. Burrow, Ortonville, MI (US); Kevin Dewey, Shelby Township, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/060,138

(22) Filed: Mar. 3, 2016

(51) Int. Cl.
*H01H 1/42* (2006.01)
*B60R 22/48* (2006.01)
*B60R 22/00* (2006.01)

(52) U.S. Cl.
CPC .............. *B60R 22/48* (2013.01); *H01H 1/42* (2013.01); *B60R 22/00* (2013.01); *B60R 2022/4816* (2013.01); *B60R 2022/4858* (2013.01)

(58) Field of Classification Search
CPC ............ A44B 11/2515; A44B 11/2534; A44B 11/2538; B60R 22/03; B60R 2022/021; B60R 2022/1806; B60R 2022/4816; B60R 2022/485; B60R 22/00
USPC ......... 200/61.54, 61.55, 85 A; 280/806, 807, 280/733, 808, 802, 804; 297/468, 297/473–476
See application file for complete search history.

(56) References Cited

U.S. PATENT DOCUMENTS

| | | | |
|---|---|---|---|
| 6,374,609 B1 | 4/2002 | Evans et al. | |
| 7,784,825 B2 * | 8/2010 | Frisch | B60R 21/2035 200/61.55 |
| 2007/0266885 A1 | 11/2007 | Takimoto | |
| 2011/0080279 A1 * | 4/2011 | Lanter | B60R 22/48 340/457.1 |
| 2012/0292893 A1 * | 11/2012 | Baca | B60R 21/18 280/730.1 |
| 2015/0298651 A1 * | 10/2015 | Klaasen | B60R 22/48 200/61.58 B |

FOREIGN PATENT DOCUMENTS

DE 298 22 622 U1 2/1999
WO WO 2010/003536 A1 1/2010

* cited by examiner

*Primary Examiner* — Edwin A. Leon
*Assistant Examiner* — Ahmed Saeed
(74) *Attorney, Agent, or Firm* — Brinks Gilson & Lione

(57) ABSTRACT

A seatbelt buckle apparatus for a motor vehicle is provided. The apparatus includes a buckle housing that provides at least part of a structure for selectively coupling a seatbelt latch plate to the apparatus. A switch housing houses at least part of a switch. The switch monitors whether or not the seatbelt latch plate is coupled to the seatbelt buckle apparatus. A switch wire harness is in communication with the switch. A strain relief-guide feature carries and guides a section of the switch wire harness so as to provide strain relief to the switch wire harness when a force is applied to the switch wire harness downstream from the strain relief-guide feature.

20 Claims, 8 Drawing Sheets

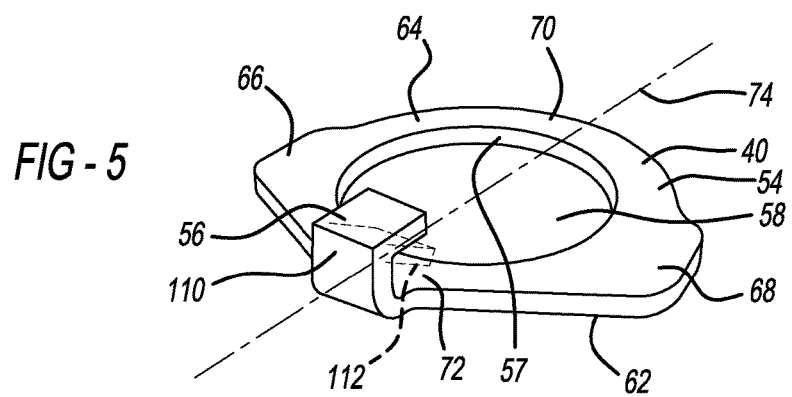
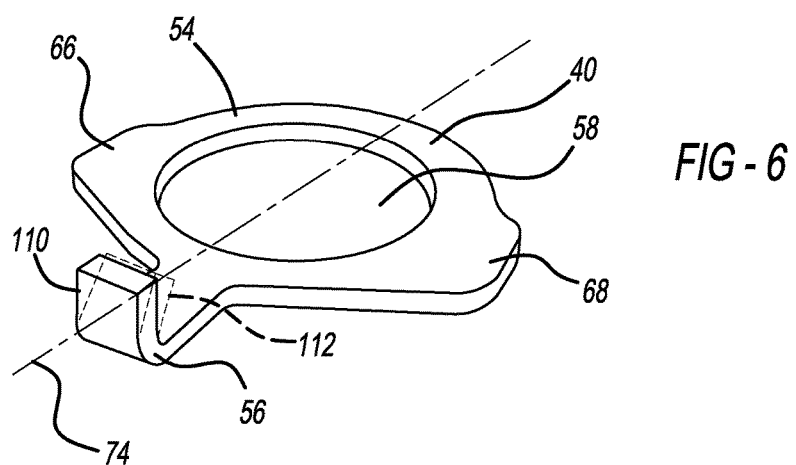
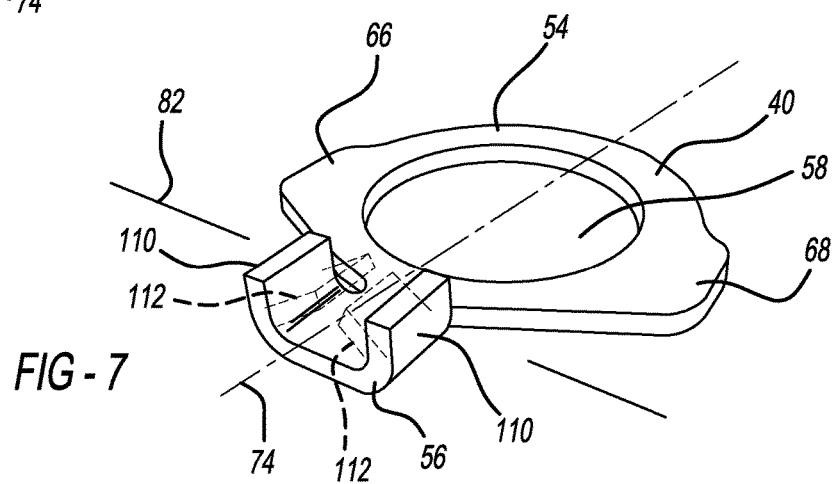

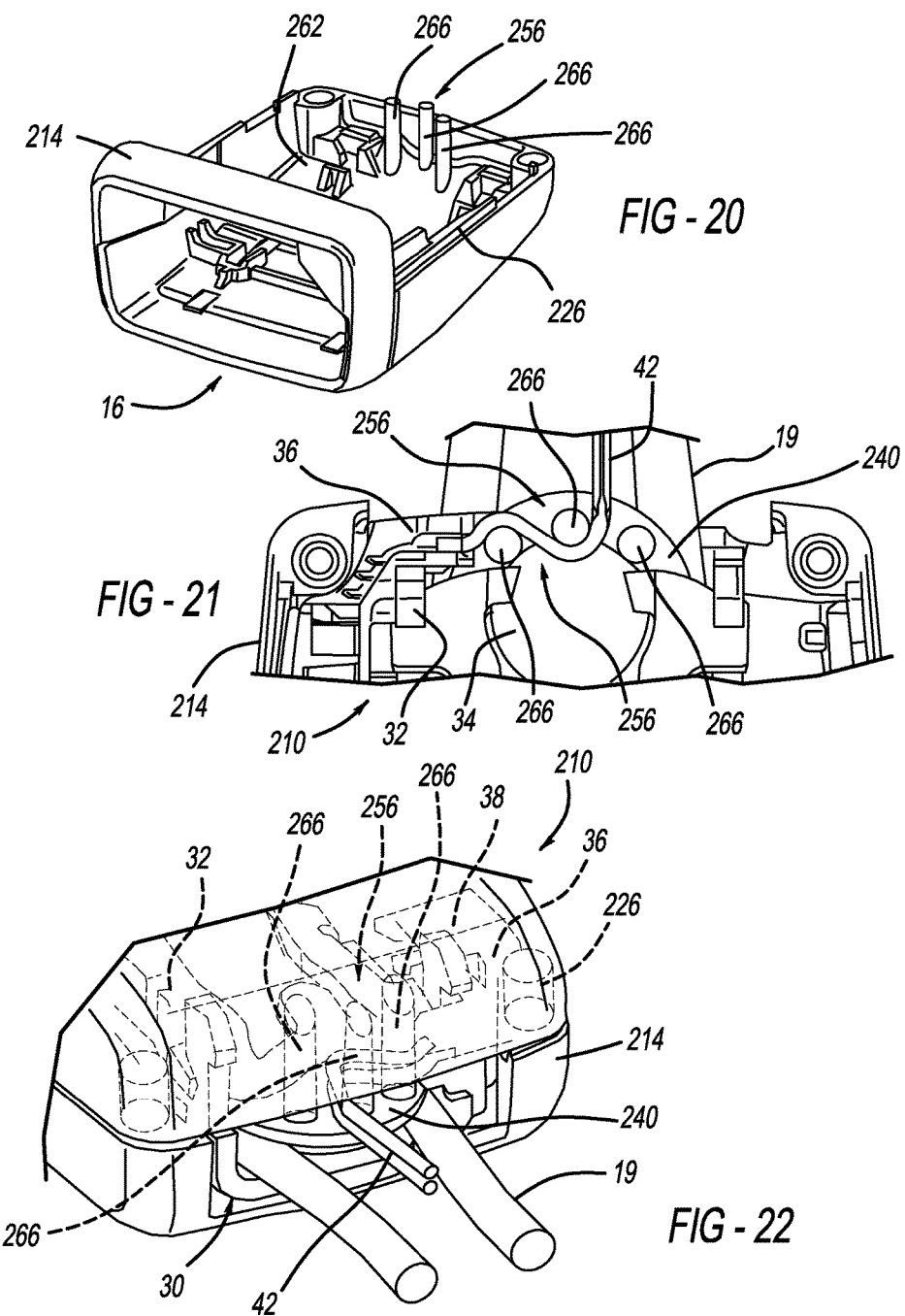

SEATBELT BUCKLE APPARATUSES INCLUDING SWITCH WIRE HARNESSES AND STRAIN RELIEF THEREOF

TECHNICAL FIELD

The technical field relates generally to seatbelt restraint systems for motor vehicles, and more particularly relates to seatbelt buckles for motor vehicles including a switch wire harness in communication with a switch for determining, for example, whether or not the seatbelt buckle is buckled together with a seatbelt latch plate.

BACKGROUND

Seatbelt restraint systems for restraining an occupant in a vehicle seat of a motor vehicle play an important role in vehicle crash situations. Seatbelt restraint systems commonly have a lap belt section and a shoulder belt section. In general, the lap belt section and the shoulder belt section are connected together at one end. A seatbelt restraint system includes a latch plate at the connected end. The seatbelt restraint system also includes a buckle device connected at one end by cable, webbing, or the like that is attached directly or indirectly to the vehicle structure. The buckle receives the latch plate to be buckled together. When the buckle and the latch plate are buckle together, the seatbelt restraint system restrains movement of the occupant during a collision.

Various designs for buckle devices including locking and releasing mechanisms for selectively coupling the buckle with the latch plate presently exist. Some non-limiting examples of buckle devices are described in U.S. Patent Application Publication No. 2008/0163468, filed Mar. 13, 2008, U.S. Patent Application Publication No. 2015/0166005, filed Jun. 18, 2015, and WO 2015/128345 claiming priority to DE 10 2014 102 568.7, filed Feb. 27, 2014, which are commonly owned by the assignee of the present application and are hereby incorporated by reference in their entirety for all purposes. Generally, a buckle device includes a main body or buckle housing that receives a latch plate when inserted into the buckle device. Once inserted, a spring urges a latch member to engage the latch plate in a direction in which the latch plate is latched or coupled to the buckle housing. A lock member allows the latch member to maintain the latched condition and a push-button can be actuated to unlock the lock member and release the latch plate from the latched condition.

In such buckle devices, it may be necessary to determine the latch state (e.g., latched or unlatched condition) of the tongue plate with the buckle housing. One conventional approach is to use a switch that is packaged in the buckle device and that is configured to monitor whether the latch plate is coupled or not coupled to the buckle device. This information is transmitted from the buckle device via a switch wire harness and used, for example, for operating an indicator lamp, for controlling a belt winding force via a retractor, or by an airbag electronic control unit (ECU) for determining whether or not to deploy an airbag.

Unfortunately, the buckle switch wire harness can be vulnerable to wire fracture from tension being applied to the switch wire harness, for example, from everyday use, repetitive movements, or the like of the buckle device. Moreover, as buckle designs become more compact, the amount of room available in the buckle device to incorporate adequate strain relief for preventing such wire fractures has become minimal. Accordingly, there is a need to provide a seatbelt buckle apparatus for a motor vehicle that can address one or more of the foregoing concerns.

BRIEF SUMMARY

Seatbelt buckle apparatuses for motor vehicles are provided herein. In accordance with an exemplary embodiment, a seatbelt buckle apparatus includes a cover that defines an inlet and an outlet. A buckle housing is at least partially covered by the cover and is configured to provide at least part of a structure for selectively coupling a seatbelt latch plate received through the inlet to the seatbelt buckle apparatus. A projection feature projects from or adjacent to the buckle housing. A switch housing is disposed adjacent to the buckle housing and is spaced apart from the projection feature. A switch is disposed at least in part in and/or on the switch housing and is configured to monitor whether the seatbelt latch plate is coupled or not coupled to the seatbelt buckle apparatus. A switch wire harness is in communication with the switch. The switch wire harnesses extends from the switch housing, through and pass the outlet. A strain relief-guide feature is spaced apart from the switch housing and carries and/or guides a section of the switch wire harness so as to provide strain relief to the switch wire harness between the strain relief-guide feature and the switch housing when a force is applied to the switch wire harness downstream from the strain relief-guide feature. The strain relief-guide feature is part of a wire harness guide structure that is mounted on the projection feature or is defined at least in part by the cover.

In accordance with another exemplary embodiment, a seatbelt buckle apparatus for a motor vehicle is provided. The seatbelt buckle apparatus includes a cover that defines an inlet and an outlet. A buckle housing is at least partially covered by the cover and is configured to provide at least part of a structure for selectively coupling a seatbelt latch plate received through the inlet to the seatbelt buckle apparatus. A projection feature projects from or adjacent to the buckle housing. A switch housing is disposed adjacent to the buckle housing spaced apart from the projection feature. A switch is disposed at least in part in and/or on the switch housing and is configured to monitor whether the seatbelt latch plate is coupled or not coupled to the seatbelt buckle apparatus. A switch wire harnesses is in communication with the switch and extends from the switch housing, through and pass the outlet. A wire harness guide structure is mounted on the projection feature spaced apart from the switch housing. The wire harness guide structure includes a plate section and a strain relief-guide feature integrally formed with the plate section. The strain relief-guide feature carries and guides a section of the switch wire harness so as to provide strain relief to the switch wire harness between the strain relief-guide feature and the switch housing when a force is applied to the switch wire harness downstream from the strain relief-guide feature.

In accordance with another exemplary embodiment, a seatbelt buckle apparatus for a motor vehicle is provided. The seatbelt buckle apparatus includes a cover that defines an inlet and an outlet. A buckle housing is at least partially covered by the cover and is configured to provide at least part of a structure for selectively coupling a seatbelt latch plate received through the inlet to the seatbelt buckle apparatus. A projection feature projects from or is adjacent to the buckle housing. A switch housing is disposed adjacent to the buckle housing spaced apart from the projection feature. A switch is disposed at least in part in and/or on the switch housing and is configured to monitor whether the seatbelt latch plate is coupled or not coupled to the seatbelt buckle apparatus. A switch wire harness is in communication with the switch and extends from the switch housing through and pass the outlet. A strain relief-guide feature is defined at least in part by the cover and is spaced apart from the switch housing. The strain relief-guide feature carries and/or guides a section of the switch wire harness so as to provide strain relief to the switch wire harness between the strain relief-guide feature and the switch housing when a force is applied to the switch wire harness downstream from the strain relief-guide feature.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way. In the drawing figures, like numerals denote like elements.

FIG. 5 is a perspective rear view of a wire harness guide structure in accordance with an exemplary embodiment;

FIG. 6 is a perspective rear view of a wire harness guide structure in accordance with another exemplary embodiment;

FIG. 7 is a perspective rear view of a wire harness guide structure in accordance with another exemplary embodiment;

FIG. 20 is a perspective rear view of a cover portion of the seatbelt buckle apparatus depicted in FIG. 19;

FIG. 21 is a perspective rear view of a portion of the seatbelt buckle apparatus depicted in FIG. 19; and FIG. 22 is a top view of a portion of the seatbelt buckle apparatus depicted in FIG. 19.

DETAILED DESCRIPTION OF THE INVENTION

The following description is merely exemplary in nature and is not intended to limit the present disclosure or its application or uses.

Figure 1:
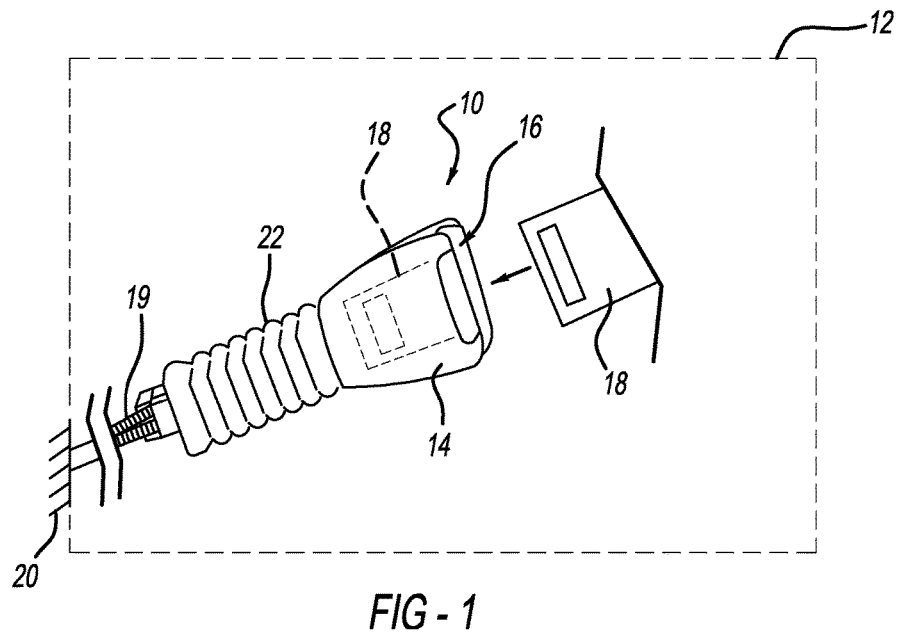
FIG. 1 is perspective side of a seatbelt buckle apparatus and a seatbelt latch plate for a motor vehicle in accordance with an exemplary embodiment.

Referring now to the drawings, FIG. 1 shows a seatbelt buckle apparatus 10 for a motor vehicle 12 in accordance with an exemplary embodiment. The seatbelt buckle apparatus 10 includes a cover 14. The cover 14 has an inlet 16 for receiving a seatbelt latch plate 18 that forms, for example, part of a lap belt or shoulder belt connected at one end to webbing (not shown) that is attached to the vehicle structure and/or a seat.

As will be discussed in further detail below, the seatbelt buckle apparatus 10 may be operatively attached to the vehicle structure 20 by a cable 19 either directly or indirectly, for example, via a pretensioner device, anchor plate, or the like. In the illustrated example, a portion of the cable 19 adjacent to the cover 14 may be covered, for example, by a plastic sleeve 22.

Referring to FIGS. 1-4, in an exemplary embodiment, the cover 14 includes a lower cover portion 24 and an upper cover portion 26 that are cooperatively configured and coupled together to define a buckle internal volume 28 and an outlet 30 on a side opposite the inlet 16. The buckle internal volume 28 is open to and accessible from the inlet 16 and, independently, from the outlet 30. As illustrated, at least partially covered by the cover 14 and disposed in the buckle internal volume 28, are a buckle main body or buckle housing 32 (e.g., frame structure), a projection feature 34, a switch housing 36, a switch 38, a wire harness guide structure 40, a switch wire harness 42, and a portion of the cable 19.

In an exemplary embodiment, the buckle housing 32 forms at least part of a structure for selectively coupling the seatbelt latch plate 18, received through the inlet 16, to the seatbelt buckle apparatus 10. As discussed above, various designs for buckle locking and releasing mechanisms for selectively coupling the seatbelt latch plate 18 with the structure of the seatbelt buckle apparatus 10 formed at least in part by the buckle housing 32 are well known (e.g., described in U.S. Patent Application Publication No. 2008/0163468, U.S. Patent Application Publication No. 2015/0166005, WO 2015/128345, and DE 10 2014 102 568.7 which are incorporated herein by reference in their entirety).

Figure 3:
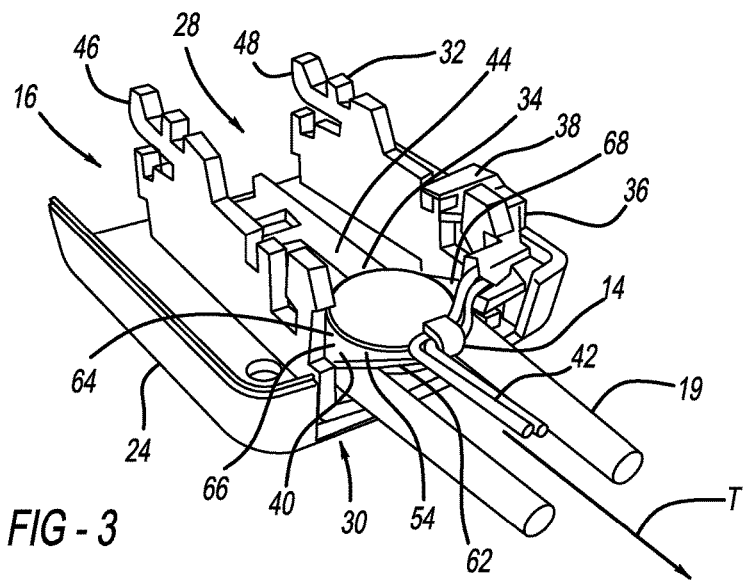
FIG. 3 is a perspective rear view of a portion of a seatbelt buckle apparatus in accordance with an exemplary embodiment.
Figure 4:
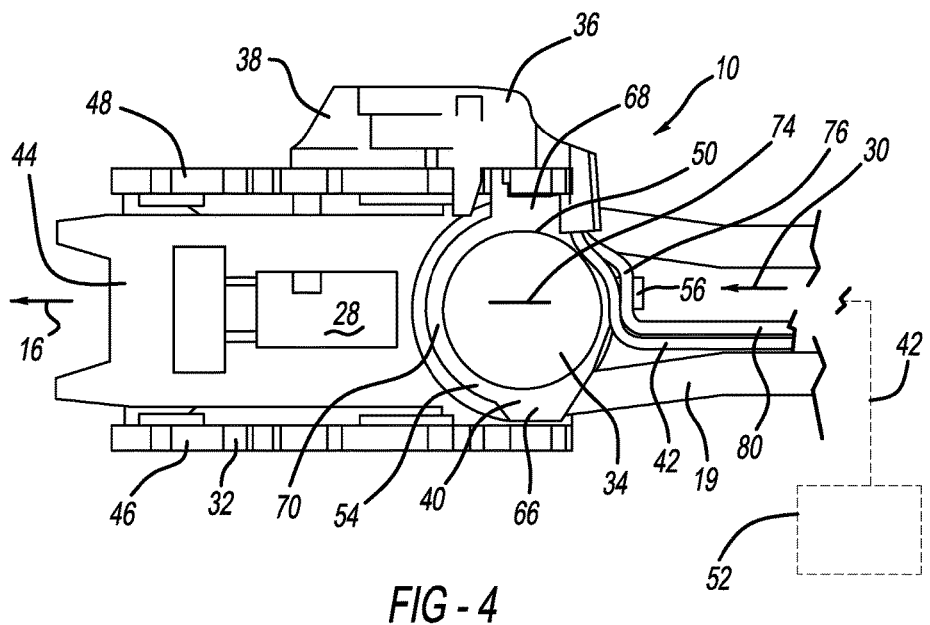
FIG. 4 is a top view of a portion of a seatbelt buckle apparatus in accordance with an exemplary embodiment.

As illustrated in FIGS. 3-4, the buckle housing 32 has a housing base section 44 and housing wall sections 46 and 48 spaced apart and extending generally upwardly from opposing edges of the housing base section 32 to form a substantially U-shaped frame structure. As used herein, the term "substantially" is understood to mean within conventional manufacturing and/or operational tolerances for a particular component(s), assembly, and/or item being referenced. The projection feature 34 extends or projects generally up from or adjacent to (e.g., through and upward from) the housing base section 44 of the buckle housing 32 between the housing wall sections 46 and 48. In an exemplary embodiment, the projection feature 34 has a curved or arcuate sidewall 50, such as, for example, a substantially cylindrical sidewall. The housing base section 44 may be made of metal (e.g., steel, aluminum, metal alloys, or the like) that is formed using a progressive die stamping process or the like, and the projection feature 34 may be a rivet, bolt, or other structural positive feature.

Figure 2:
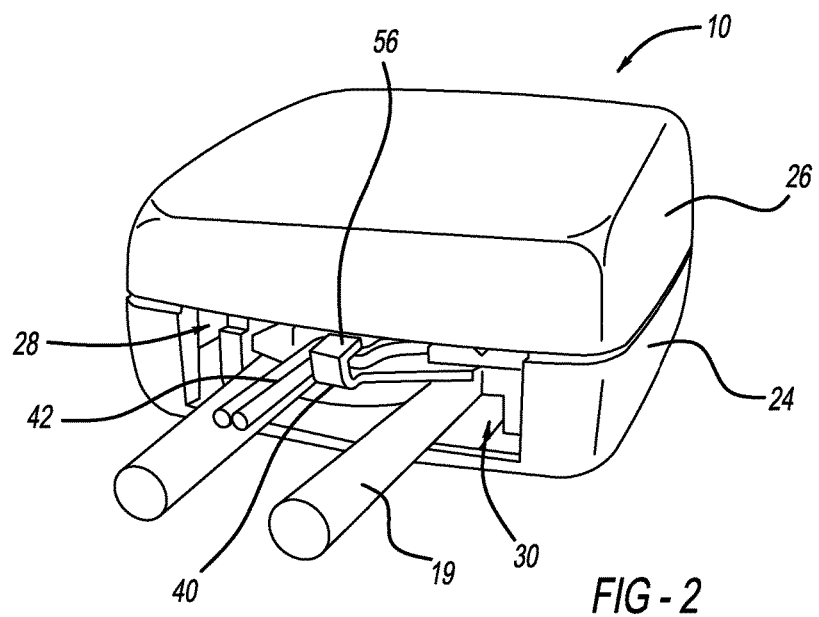
FIG. 2 is a perspective rear view of a seatbelt buckle apparatus in accordance with an exemplary embodiment.

Referring to FIGS. 2-4, the cable 19 is wrapped partially around the projection feature 34 along the forward portion (e.g., facing toward the inlet 16) and side portions (e.g., facing towards the housing wall sections 46 and 48) of the arcuate sidewall 50 to operatively coupled the cable 19 to the projection feature 34. The cable 19 extends rearward from the projection feature 34, through and pass the outlet 30 for direct or indirect attachment to the vehicle structure 20 as discussed above in relation to FIG. 1.

As illustrated, in an exemplary embodiment, the switch housing 36 is disposed adjacent to the buckle housing 32 on and/or along an upper portion of the housing wall section 48 spaced apart from the projection feature 34. The switch 38 is disposed at least in part in and/or on the switch housing 36 for monitoring whether the seatbelt latch plate 18 (see FIG. 1) is coupled or not coupled to the seatbelt buckle apparatus 10. The switch 38 may include a strain sensor(s), a Hall sensor arrangement, or any other switch/sensor arrangement known to those skilled in the art for monitoring whether seatbelt buckle device is buckled together with a latch plate.

The switch wire harness 42 is coupled to and in communication with the switch 38 and extends from the switch housing 36, through and pass the outlet 30 adjacent to the cable 19. In an exemplary embodiment, the switch wire harness 42 is coupled to an airbag electronic control unit (ECU) 52 for determining whether or not to deploy an airbag depending upon the latch condition of the seatbelt buckle apparatus 10.

Spaced apart from the switch wire harness 42 and mounted on the projection feature 34, is the wire harness guide structure 40. As illustrated, the wire harness guide structure 40 is disposed over the housing base section 44 and between the housing wall sections 46 and 48. In an exemplary embodiment, the wire harness guide structure 40 includes a plate section 54 and a strain relief-guide feature 56 (e.g., hook feature) that is coupled to the plate section 54.

Referring also to FIG. 5, the plate section 54 has a substantially flat ring shape and has an inner perimeter edge portion 57 that defines an opening 58 formed through the plate section 54. In an exemplary embodiment, the projection feature 34 extends through the opening 58 and the inner perimeter edge portion 57 of the plate section 54 substantially matches and interfaces with the arcuate sidewall 50 of the projection feature 34. In one example, the inner perimeter edge portion 57 defines the opening 58 configured as a circular opening that is sized and matched to the arcuate sidewall 50 having a substantially cylindrical sidewall shape.

As illustrated in FIG. 3, the wire harness guide structure 40 overlies the cable 19 and the cable 19 overlies housing base section 44 of the buckle housing 32. In particular, the wire harness guide structure 40 has a lower surface 62 that is disposed adjacent to the cable 19 and an upper surface 64 that is disposed adjacent to a section of the switch wire harness 42.

Referring again to FIGS. 3-5, the plate section 54 of the wire harness guide structure 40 has anti-rotation tabs 66 and 68 formed between the front portion 70 (e.g., disposed adjacent to the inlet 16) and back portion 72 (e.g., disposed adjacent to the outlet 30) of the plate section 54. The anti-rotation tabs 66 and 68 are disposed on opposite sides of the plate section 54 extending towards the housing wall sections 46 and 48, respectively. In an exemplary embodiment, the anti-rotation tabs 66 and 68 have outer edges (e.g., outer-most edges) that interface with the housing wall sections 46 and 48 (e.g., interference fit) to help prevent the wire harness guide structure 40 from rotating relative to the projection feature 34.

Coupled to and extending along a longitudinal axis 74 from the back portion 72 of the wire harness guide structure 40, is the strain relief-guide feature 56. The strain relief-guide feature 56 is configured to carry and guide a section 76 of the switch wire harness 42 so as to provide strain relief to the switch wire harness 42 between the strain relief-guide feature 56 and the switch housing 36 when a force (e.g., tension force (T)) is applied to the switch wire harness 42 downstream from the strain relief-guide feature 56. As illustrated, the switch housing 36 is disposed above and laterally adjacent to the strain relief-guide feature 56 and the strain relief-guide feature 56 supports and guides the section 76 such that the section 78 of the switch wire harness 42 extends downward and transverse to the longitudinal axis 74 and a remaining downstream section 80 extends rearward substantially parallel to the longitudinal axis 74. In an exemplary embodiment, by carrying, supporting, and/or guiding the section 76 of the switch wire harness 42 that is spaced apart from the switch housing 36, a section 78 of the switch wire harness 42 disposed between the switch housing 36 and the strain relief-guide feature 56 remains substantially unstrained even when the force (T) is applied to the remaining downstream section 80 of the switch wire harness 42. Without being limited by theory, it is believed that the strain relief-guide feature 56 helps absorbs at least some of the stress and corresponding strain from the switch wire harness 42 when the force (T) is applied such that these stresses and corresponding strains substantially do not transfer to the section 78 of the switch wire harness 42. As such, strain relief is provided proximate the interface between the switch housing 36 and the switch wire harness 42 to thereby prevent, reduce, or minimize cracking of the switch wire harness 42 in the seatbelt buckle apparatus 10.

Figure 8:
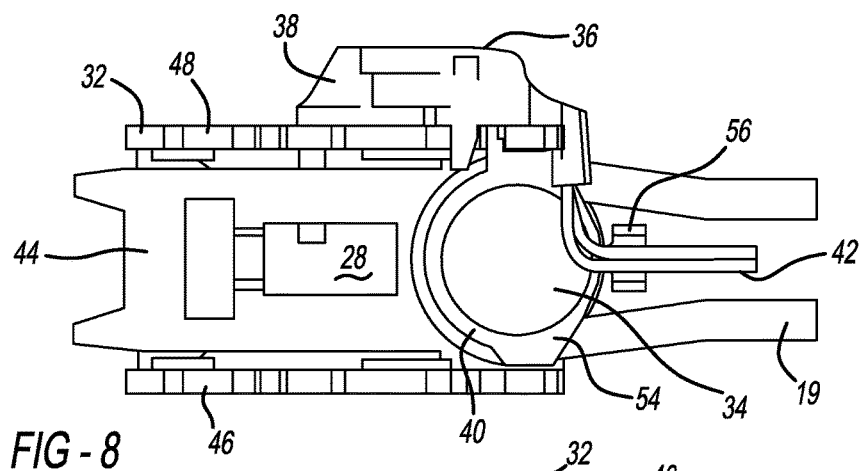
FIG. 8 is a top view of a portion of a seatbelt buckle apparatus in accordance with another exemplary embodiment.

In an exemplary embodiment, the strain relief-guide feature 56 is integrally formed with the plate section 54 to form a monolithic wire harness guide structure. In one embodiment, the strain relief-guide feature 56 in an un-crimped condition 110 has a generally C-shaped cross-section substantially parallel to the longitudinal axis 74 and may be deformed to a crimped condition 112 as indicated by the dashed lines to further couple to the switch wire harness 42. In an alternative embodiment and as illustrated in FIG. 6, the strain relief-guide feature 56 in the un-crimped condition 110 has a generally L-shaped cross-section substantially parallel to the longitudinal axis 74 and may be deformed to the crimped condition 112 as indicated by the dashed lines to further couple to the switch wire harness 42. In an alternative embodiment and as illustrated in FIGS. 7-8, the strain relief-guide feature 56 in the un-crimped condition 110 has a generally U-shaped cross-section transverse (e.g., parallel to transverse axis 82) to the longitudinal axis 74 and may be deformed to the crimped condition 112 as indicated by the dashed lines to further couple to the switch wire harness 42.

Figure 9:
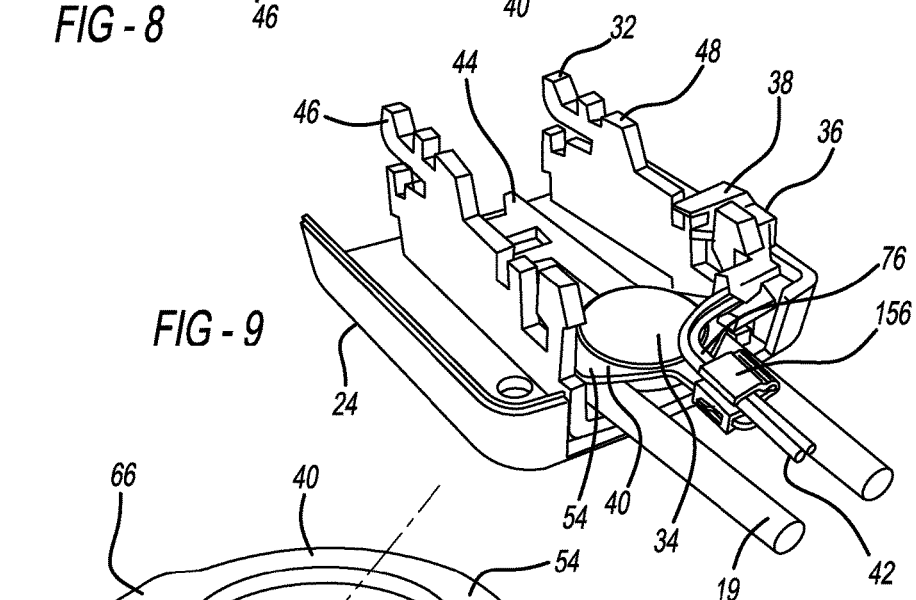
FIG. 9 is a perspective rear view of a portion of a seatbelt buckle apparatus in accordance with an exemplary embodiment.
Figure 10:
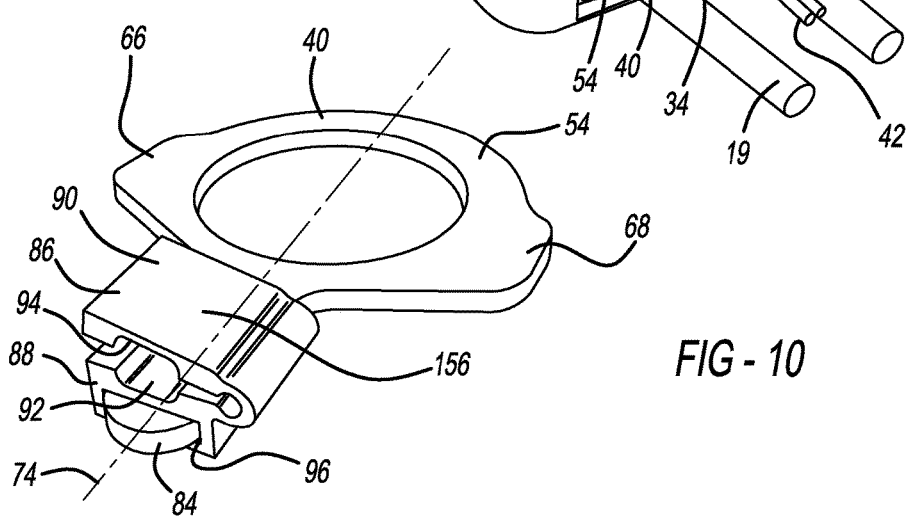
FIG. 10 is a perspective rear view of a wire harness guide structure in accordance with another exemplary embodiment.

Referring to FIG. 9-10, in an exemplary embodiment, the wire harness guide structure 40 includes a tab section 84 that is integrally formed with and extends from the plate section 54 along the longitudinal axis 74. As illustrated, the strain relief-guide feature 156 is configured as a clip 86 that is mounted on the tab section 84. In particular, the clip 86 has a base portion 88 and a lid portion 90 that is hingedly coupled (e.g., via a living hinge formed via a plastic injection molding process or the like) to the base portion 88. Each of the base and lid portions 88 and 90 have a groove 92 or 94 formed therein. When the base and lid portions 88 and 90 are brought together and clamped, the grooves 92 and 94 are aligned and cooperate to carry and guide the section 76 of the switch wire harness 42. In an exemplary embodiment, the base portion 88 further includes a channel 96 disposed under the groove 92. As illustrated, the tab section 84 is disposed through the channel 96 for attaching the strain relief-guide feature 156 to the tab section 84.

FIGS. 11-22 illustrates a seatbelt buckle apparatus 210 for the motor vehicle 12 (shown FIG. 1) in accordance with various alternative exemplary embodiments. In particular, the seatbelt buckle apparatus 210 shown in FIGS. 11-22 is similarly configured to the seatbelt buckle apparatus 10 illustrated in FIGS. 1-10 including the buckle housing 32, the projection feature 34, the switch housing 36, the switch 38, the cable 19 extending through the outlet 30, and the switch wire harness 42 but with the exception that the strain relief-guide feature 256 is defined at least in part by the cover 214 that includes the upper cover portion 226 and not necessarily by the wire harness guide structure 240, and wherein like numerals denote like elements.

Figure 11:
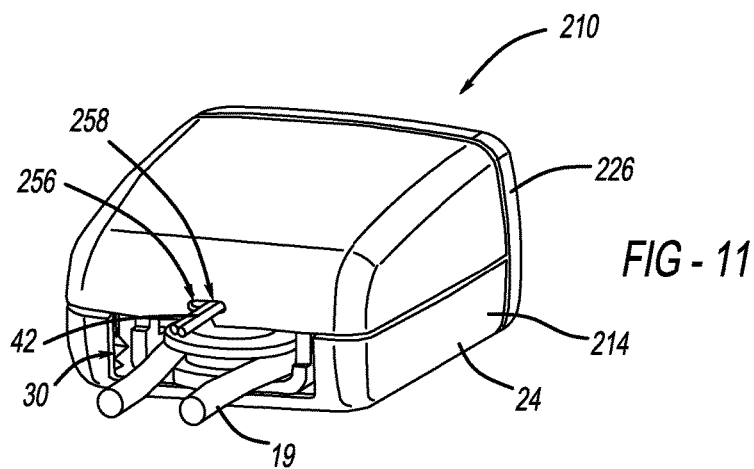
FIG. 11 is a perspective rear view of a seatbelt buckle apparatus in accordance with another exemplary embodiment.
Figure 12:
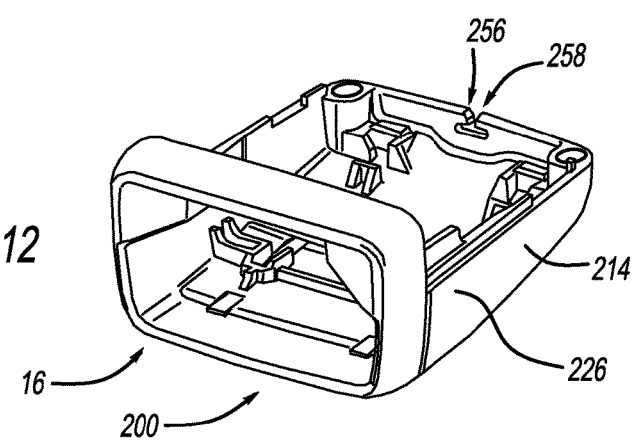
FIG. 12 is a perspective rear view of a cover portion of the seatbelt buckle apparatus depicted in FIG. 11.
Figure 13:
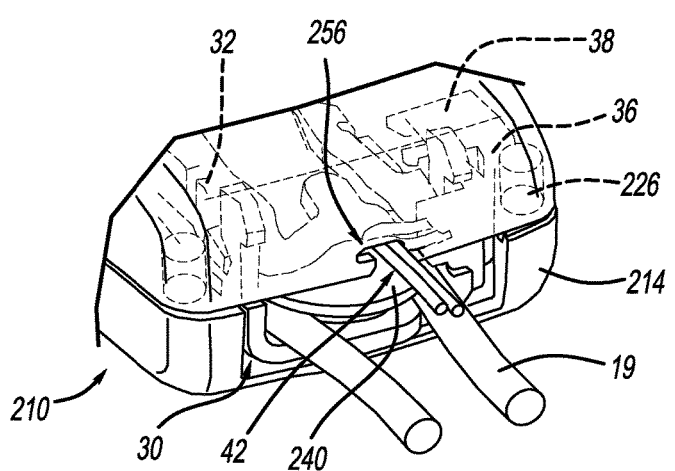
FIG. 13 is a perspective rear view of a portion of the seatbelt buckle apparatus depicted in FIG. 11.
Figure 14:
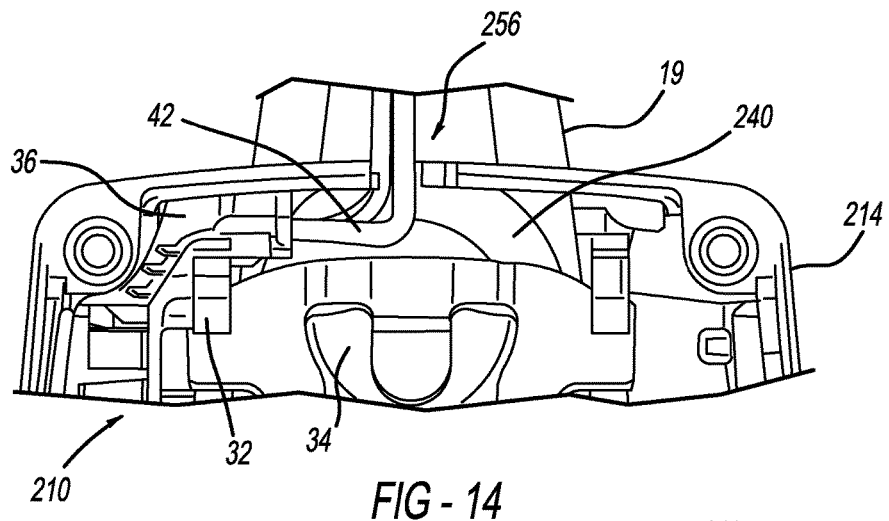
FIG. 14 is a top view of a portion of the seatbelt buckle apparatus depicted in FIG. 11.
Figure 15:
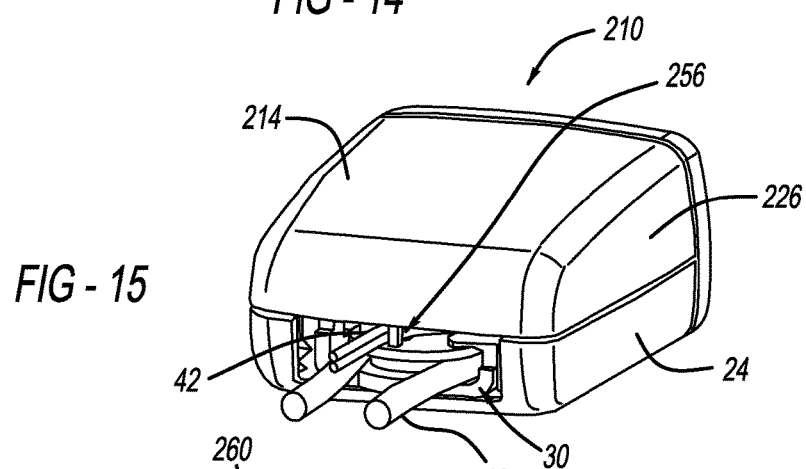
FIG. 15 is a perspective rear view of a seatbelt buckle apparatus in accordance with another exemplary embodiment.
Figure 16:
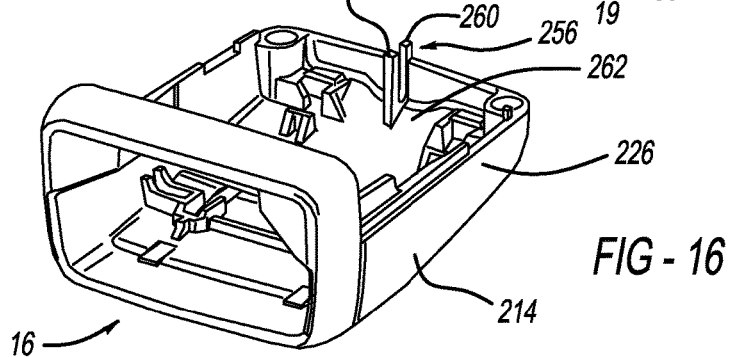
FIG. 16 is a perspective rear view of a cover portion of the seatbelt buckle apparatus depicted in FIG. 15.
Figure 17:
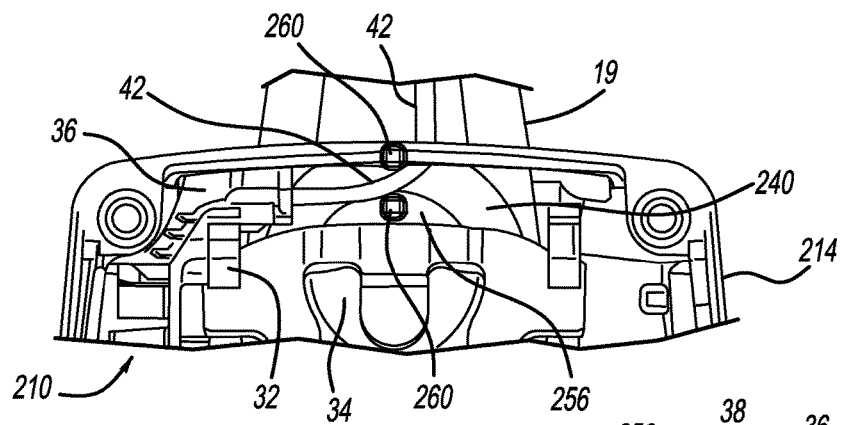
FIG. 17 is a perspective rear view of a portion of the seatbelt buckle apparatus depicted in FIG. 15.
Figure 18:
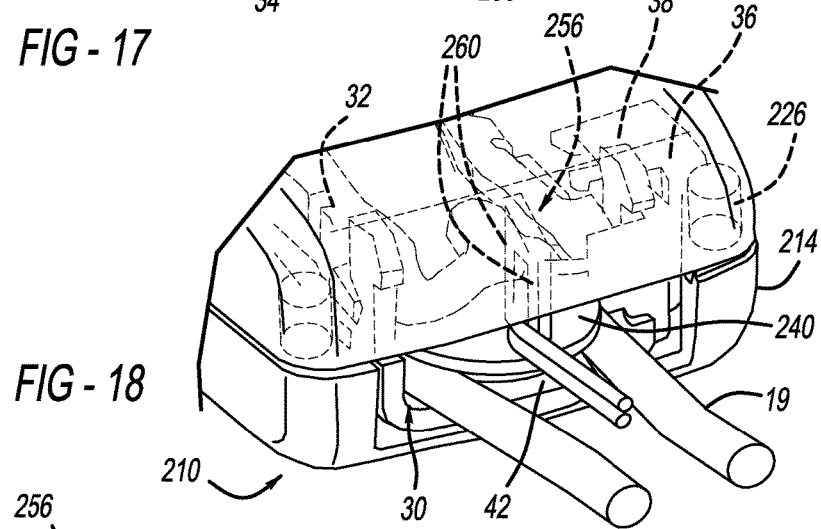
FIG. 18 is a top view of a portion of the seatbelt buckle apparatus depicted in FIG. 15.
Figure 19:
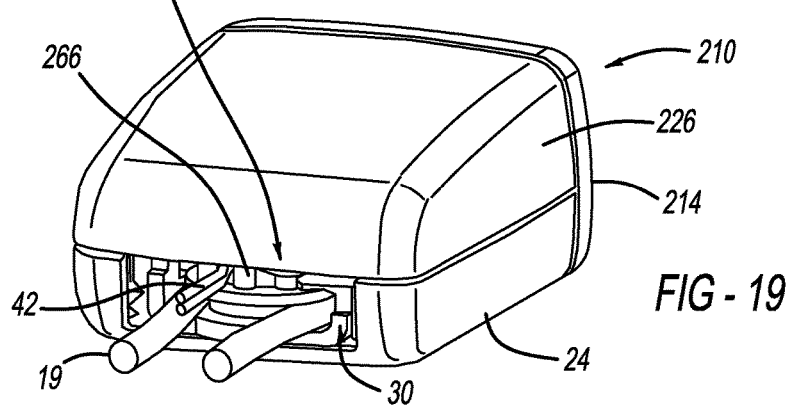
FIG. 19 is a perspective rear view of a seatbelt buckle apparatus in accordance with another exemplary embodiment.

Referring to FIGS. 11-13, in an exemplary embodiment, the cover 214 has an opening 258 that is formed through the cover 214 adjacent to the outlet 30. The switch wire harness 42 passes through the opening 258 for strain relief as discussed above. In one example and as illustrated, the opening 258 is configured as a slot, such as an open "T" slot that is continuous with the outlet 30. Advantageously, the opening 258 can be molded into the cover 214 during fabrication (e.g., molding) of the cover 214. Other opening configurations may be used to retain, clip, or otherwise guide the switch wire harness 42 for strain relief. Additionally, although the opening 258 is shown extending through the upper cover portion 226, the opening 258 can be positioned anywhere on the cover 214 either adjacent to the outlet 30 or otherwise and through the lower cover portion 24 or the upper cover portion 226 of the cover 214.

Referring to FIGS. 15-18, in an exemplary embodiment, the cover 214 has a plurality of elongated features 260, such as two or more elongated features 260, for example two elongated features 260, that extend from an interior surface 262 of the cover 214 towards the wire harness guide structure 240. In one example, the elongated features 260 are configured as spaced apart posts or walls that create or define a passage through which the switch wire harness 42 is arranged and is entrapped or captured. Advantageously, the elongated features 260 can be molded with the cover 214 during fabrication (e.g., molding) of the cover 214. In one embodiment, the elongated features 260 extend to and nearly or directly contact the wire harness guide structure 240 (e.g., space if any between the elongated features 260 and the wire harness guide structure 240 is less than the diameter of the switch wire harness 42) to facilitate entrapping the switch wire harness 42 in the passage space that is created between the elongated features 260. The elongated features 260 can be parallel, waving, or any elongated design to create entrapment of the switch wire harness 42. Additionally, the elongated features 260 can be moved to any position on the cover 214, for example on either the upper cover portion 226 or the lower cover portion 24 of the cover 214, to facilitate the switch wire harness 42 exiting the cover 214 at a predetermined or desired location.

Referring to FIGS. 19-22, in an exemplary embodiment, the cover 214 has a plurality of elongated features 266, such as two or more elongated features 266, such as three or more elongated features 266, for example three elongated features 266, that extend from the interior surface 262 of the cover 214 towards the wire harness guide structure 240. In one embodiment, the elongated features 266 are configured as spaced apart posts that create or define a tortuous passage through which the switch wire harness 42 is arranged and is entrapped, captured, retained, or otherwise resistant to being advanced therethrough. In one example, the elongated features 266 create an "S-shaped" tortuous passage through which the switch wire harness 42 is arranged (e.g., the switch wire harness 42 is partially wrapped about each of the elongated features 266 such that the section of the switch wire harness 42 disposed in the tortuous passage has a substantially "S-shaped" configuration). Advantageously, the elongated features 266 can be molded with the cover 214 during fabrication (e.g., molding) of the cover 214. In one embodiment, the elongated features 266 extend to and nearly or directly contact the wire harness guide structure 240 (e.g., space if any between the elongated features 266 and the wire harness guide structure 240 is less than the diameter of the switch wire harness 42) to facilitate retaining the switch wire harness 42 in the tortuous passage space that is created between the elongated features 266. The elongated features 266 can be parallel, waving, or any elongated design to create entrapment of the switch wire harness 42. Additionally, the elongated features 266 can be moved to any position on the cover 214, for example on either the upper cover portion 226 or the lower cover portion 24 of the cover 214, to facilitate the switch wire harness 42 exiting the cover 214 at a predetermined or desired location.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A seatbelt buckle apparatus for a motor vehicle, comprising:
   a cover defining an inlet and an outlet;
   a buckle housing at least partially covered by the cover and configured to provide at least part of a structure for selectively coupling a seatbelt latch plate received through the inlet to the seatbelt buckle apparatus;
   a projection feature projecting from or adjacent to the buckle housing;
   a switch housing disposed adjacent to the buckle housing spaced apart from the projection feature;
   a switch disposed at least in part in and/or on the switch housing and configured to monitor whether the seatbelt latch plate is coupled or not coupled to the seatbelt buckle apparatus;
   a switch wire harness in communication with the switch and extending from the switch housing through and pass the outlet; and
   a strain relief-guide feature that is spaced apart from the switch housing and that carries and/or guides a section of the switch wire harness so as to provide strain relief to the switch wire harness between the strain relief-guide feature and the switch housing when a force is applied to the switch wire harness downstream from the strain relief-guide feature, wherein the strain relief-guide feature is part of a wire harness guide structure that is mounted on the projection feature or is defined at least in part by the cover.

2. The seatbelt buckle apparatus of claim 1, wherein the seatbelt buckle apparatus comprises the wire harness guide structure that comprises the strain relief-guide feature, wherein the wire harness guide structure comprises a plate section that is coupled to the strain relief-guide feature and that has an opening formed therethrough, and wherein the projection feature extends through the opening of the plate section.

3. The seatbelt buckle apparatus of claim 2, wherein the projection feature has an arcuate sidewall and the plate section has an inner perimeter edge portion substantially matching and interfacing with the arcuate sidewall of the projection feature.

4. The seatbelt buckle apparatus of claim 3, further comprising a cable that is operatively coupled to the projection feature and extends from the projection feature through and pass the outlet.

5. The seatbelt buckle apparatus of claim 4, wherein the wire harness guide structure overlies the cable that overlies at least an adjacent portion of the buckle housing.

6. The seatbelt buckle apparatus of claim 5, wherein the wire harness guide structure has a lower surface that is disposed adjacent to the cable and an upper surface on a side opposite the lower surface, and wherein the section of the switch wire harness is disposed adjacent to the upper surface of the wire harness guide structure.

7. The seatbelt buckle apparatus of claim 2, wherein the buckle housing has a housing base section and a first housing wall section extending generally upwardly from a first edge of the housing base section and a second housing wall section extending generally upwardly from a second edge of the housing base section that is opposite the first edge, and wherein the wire harness guide structure is disposed over the housing base section and between the first and second housing wall sections.

8. The seatbelt buckle apparatus of claim 7, wherein the plate section of the wire harness guide structure has a front portion disposed adjacent to the inlet and a back portion opposite the front portion and adjacent to the outlet, and wherein the strain relief-guide feature is coupled to the back portion of the plate section.

9. The seatbelt buckle apparatus of claim 8, wherein the switch housing is disposed on the second wall section of the buckle housing spaced apart and laterally adjacent to the strain relief-guide feature and/or the back portion of the plate section.

10. The seatbelt buckle apparatus of claim 8, wherein the plate section has a first anti-rotation tab formed between the front and back portions of the plate section and extending towards the first housing wall section, and wherein the first anti-rotation tab has a first outer edge that interfaces with the first housing wall section to facilitate preventing the wire harness guide structure from rotating relative to the projection feature.

11. The seatbelt buckle apparatus of claim 10, wherein the plate section has a second anti-rotation tab formed between the front and back portions of the plate section opposite the first anti-rotation tab and extending towards the second housing wall section, and wherein the second anti-rotation tab has a second outer edge that interfaces with the second housing wall section to facilitate preventing the wire harness guide structure from rotating relative to the projection feature.

12. The seatbelt buckle apparatus of claim 1, wherein the seatbelt buckle apparatus comprises the wire harness guide structure that comprises the strain relief-guide feature, and wherein the wire harness guide structure comprises:
a plate section; and
a tab section integrally formed with and extending from the plate section, wherein the strain relief-guide feature is mounted on the tab section and is configured as a clip.

13. A seatbelt buckle apparatus for a motor vehicle, comprising:
a cover defining an inlet and an outlet;
a buckle housing at least partially covered by the cover and configured to provide at least part of a structure for selectively coupling a seatbelt latch plate received through the inlet to the seatbelt buckle apparatus;
a projection feature projecting from or adjacent to the buckle housing;
a switch housing disposed adjacent to the buckle housing spaced apart from the projection feature;
a switch disposed at least in part in and/or on the switch housing and configured to monitor whether the seatbelt latch plate is coupled or not coupled to the seatbelt buckle apparatus;
a switch wire harness in communication with the switch and extending from the switch housing through and pass the outlet; and
a wire harness guide structure mounted on the projection feature spaced apart from the switch housing and comprising a plate section and a strain relief-guide feature integrally formed with the plate section, wherein the strain relief-guide feature carries and guides a section of the switch wire harness so as to provide strain relief to the switch wire harness between the strain relief-guide feature and the switch housing when a force is applied to the switch wire harness downstream from the strain relief-guide feature.

14. The seatbelt buckle apparatus of claim 13, wherein the plate section of the wire harness guide structure has a front portion disposed adjacent to the inlet and a back portion opposite the front portion and adjacent to the outlet, and wherein the strain relief-guide feature extends from the back portion of the plate section to define a longitudinal axis.

15. The seatbelt buckle apparatus of claim 14, wherein the strain relief-guide feature in an un-crimped condition has a generally C-shaped cross-section substantially parallel to the longitudinal axis, and wherein the strain relief-guide feature is in a crimped condition or the un-crimped condition.

16. The seatbelt buckle apparatus of claim 14, wherein the strain relief-guide feature in an un-crimped condition has a generally L-shaped cross-section substantially parallel to the longitudinal axis, and wherein the strain relief-guide feature is in a crimped condition or the un-crimped condition.

17. The seatbelt buckle apparatus of claim 14, wherein the strain relief-guide feature in an un-crimped condition has a generally U-shaped cross-section transverse to the longitudinal axis, and wherein the strain relief-guide feature is in a crimped condition or the un-crimped condition.

18. A seatbelt buckle apparatus for a motor vehicle, comprising:
a cover defining an inlet and an outlet;
a buckle housing at least partially covered by the cover and configured to provide at least part of a structure for selectively coupling a seatbelt latch plate received through the inlet to the seatbelt buckle apparatus;

a projection feature projecting from or adjacent to the buckle housing;

a switch housing disposed adjacent to the buckle housing spaced apart from the projection feature;

a switch disposed at least in part in and/or on the switch housing and configured to monitor whether the seatbelt latch plate is coupled or not coupled to the seatbelt buckle apparatus;

a switch wire harness in communication with the switch and extending from the switch housing through and pass the outlet; and a strain relief-guide feature that is defined at least in part by the cover and that is spaced apart from the switch housing, wherein the strain relief-guide feature carries and/or guides a section of the switch wire harness so as to provide strain relief to the switch wire harness between the strain relief-guide feature and the switch housing when a force is applied to the switch wire harness downstream from the strain relief-guide feature.

19. The seatbelt buckle apparatus of claim 18, wherein the cover defines the strain relief-guide feature configured as a slot or opening formed through the cover adjacent to the outlet, and wherein the section of the switch wire harness is disposed through the slot or opening.

20. The seatbelt buckle apparatus of claim 18, further comprising a wire harness guide structure that is mounted on the projection feature, wherein the cover defines the strain relief-guide feature configured as a plurality of elongated features spaced apart from each other and extending from an interior surface of the cover towards the wire harness guide structure adjacent to the outlet, and wherein the elongated features are arranged so as to entrap, capture, and/or provide a torturous pathway for the section of the switch wire harness.

* * * * *